(No Model.)

A. SCHELL.
BOILER CLEANER.

No. 516,979. Patented Mar. 20, 1894.

WITNESSES
Edw. P. Duvall, Jr.
L. B. Brock.

INVENTOR
Absolem Schell
by Fenelon B. Brock
Attorney

UNITED STATES PATENT OFFICE.

ABSALOM SCHELL, OF ELMIRA, NEW YORK, ASSIGNOR OF ONE-HALF TO CHARLES R. McCLAVE, OF SAME PLACE.

BOILER-CLEANER.

SPECIFICATION forming part of Letters Patent No. 516,979, dated March 20, 1894.

Application filed January 19, 1894. Serial No. 497,395. (No model.)

*To all whom it may concern:*

Be it known that I, ABSALOM SCHELL, a citizen of the United States, residing at Elmira, in the county of Chemung and State of New York, have invented certain new and useful Improvements in Boiler-Cleaners; and I do declare the following to be a full, clear, and exact description of the invention, such as will enable others skilled in the art to which it appertains to make and use the same, reference being had to the letters of reference marked on the accompanying drawings, which form a part of this specification.

My invention relates to steam boiler cleaners. The objects of my improvements are to provide a simple, cheap and efficient boiler cleaner which will intercept and collect all the impurities of the feed water as it enters the boiler, from which it may be blown out whenever it may be desired.

My invention is a surface boiler cleaner, or one in which the sediment is collected at or near the surface of the water. The action of steam and heat upon the entering feed water has the effect of precipitating any sediment or extraneous matter which may be therein, and my improvements are designed to take advantage of this action and provide for the removal of the impurities in the water at that point.

With these objects in view my invention consists in the following construction and combination of parts, the detailed features of which will first be fully described, and the features of novelty therein then set forth and claimed.

Figure 1:
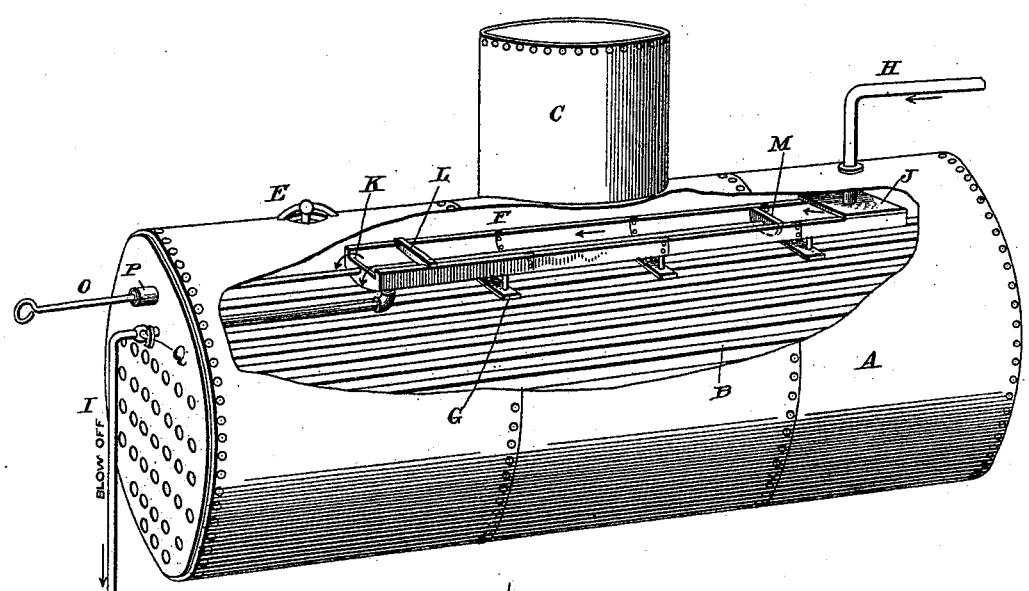
Figure 2:
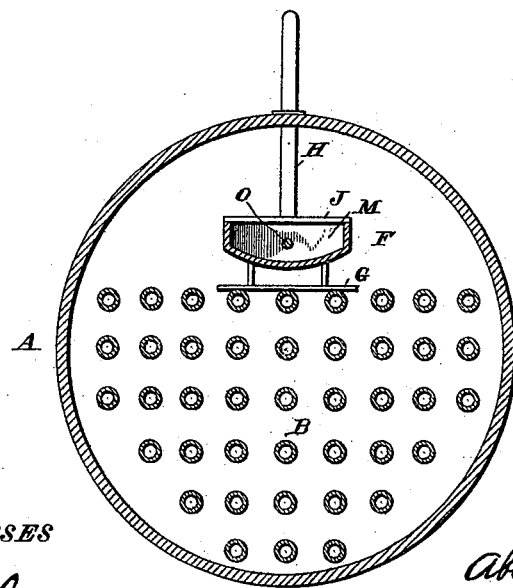

Figure 1 represents a perspective view of the steam boiler to which I have applied my improvements. Fig. 2 is a transverse section of the same.

In the drawings—A represents a steam boiler, and B the fire flues thereof.

C is the steam dome, and E the man hole.

F represents an elongated pan having preferably a concave bottom, and provided with sides and ends but no top. G represents a series of feet or projections by means of which it is supported at a proper elevation above the flues B.

H is a feed water pipe entering the boiler at one end, and I is a blow off pipe connected with the bottom of the pan at its opposite end.

J is a plate covering the feed water entrance of the pipe H to the pan F so that the feed water will be prevented from splashing over or out of the pan as it enters it. The tail end of the pan F is cut away slightly as shown at K so as to present a slightly lower level at that point than at any other so that the inflowing feed water entering at the head of the pan will slowly traverse the length of the pan in order to intercept and allow the precipitation of any sediment before it is allowed to flow over the tail of the pan into the boiler proper.

L is a cross plate near the tail end of the pan F which projects downwardly therein a sufficient distance to arrest and detain any sedimentary matter of lighter specific gravity than the water which may float upon the surface thereof.

M is a scraper device of a conformation similar to that of the cross section of the pan, so as to fit the pan snugly. This scraper M is arranged to be reciprocated so as to travel the entire length of the pan, or nearly so.

O is a reciprocating rod passing through a gland or stuffing box P in the boiler shell, and through the tail piece K of the pan, the outer end of which is provided with a handle, so that whenever it is desired to clean the pan the scraper may be operated in order to bring down all the accumulated sediment in the pan to the tail end thereof over the blow off pipe I. Upon opening the blow off cock Q the boiler pressure causes all the sediment raked down into the tail of the pan to be blown off out of the boiler.

I prefer to make the pan in sections so that it may be readily inserted through the man hole of any boiler.

While I have shown and described but one form of pan F it will be obvious that my scraper device may be used in connection with other forms of pans and in different positions and relations to the boiler.

I claim—

The combination of a steam boiler having a pan placed therein, feed and blow off pipe connections for the pan, and a reciprocating scraper device traversing the pan, and means for operating the same.

In testimony whereof I affix my signature in presence of two witnesses.

ABSALOM SCHELL.

Witnesses:
JOHN LAIDLAN,
ALBERT N. BROWN.